United States Patent
Kim et al.

(10) Patent No.: US 8,188,720 B2
(45) Date of Patent: May 29, 2012

(54) MULTI-PHASE DC-DC CONVERTER CONTROL

(75) Inventors: Hongrae Kim, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 754 days.

(21) Appl. No.: 12/271,168

(22) Filed: Nov. 14, 2008

(65) Prior Publication Data

US 2010/0123441 A1    May 20, 2010

(51) Int. Cl.
G05F 1/59    (2006.01)
G05F 1/565   (2006.01)

(52) U.S. Cl. .................. 323/272; 323/222; 323/285

(58) Field of Classification Search ............ 323/222, 323/272, 282, 285, 271; 363/89
See application file for complete search history.

(56) References Cited

U.S. PATENT DOCUMENTS

| | | | |
|---|---|---|---|
| 5,321,600 A * | 6/1994 | Fierheller | 363/65 |
| 5,861,734 A | 1/1999 | Fasullo et al. | |
| 5,870,296 A | 2/1999 | Schaffer | |
| 6,292,378 B1 * | 9/2001 | Brooks et al. | 363/65 |
| 6,414,469 B1 | 7/2002 | Zhou et al. | |
| 6,534,960 B1 | 3/2003 | Wells et al. | |
| 6,577,109 B2 * | 6/2003 | Dancy et al. | 323/272 |
| 6,894,466 B2 | 5/2005 | Huang et al. | |
| 7,053,713 B1 | 5/2006 | Dening | |
| 7,522,434 B2 * | 4/2009 | Nahar et al. | 363/65 |
| 7,977,898 B2 * | 7/2011 | Jang et al. | 318/139 |
| 2002/0196004 A1 * | 12/2002 | Berson et al. | 323/282 |
| 2005/0040800 A1 * | 2/2005 | Sutardja | 323/283 |
| 2008/0129260 A1 * | 6/2008 | Abu Qahouq et al. | 323/272 |
| 2008/0169780 A1 * | 7/2008 | Pirozzi et al. | 318/599 |
| 2009/0218885 A1 * | 9/2009 | Ho et al. | 307/24 |
| 2009/0230899 A1 | 9/2009 | Arimura et al. | |

OTHER PUBLICATIONS

Great Britain Search Report dated Feb. 9, 2010 for corresponding British application, 1 page.

* cited by examiner

*Primary Examiner* — Adolf Berhane
*Assistant Examiner* — Fred E Finch, III
(74) *Attorney, Agent, or Firm* — David B. Kelley; Brooks Kushman P.C.

(57) ABSTRACT

A system and method of controlling a multi-phase DC-DC converter having a first phase-leg and a second phase-leg using a single current sensor and a controller is provided. The single current sensor senses an amount of current flowing through the direct current link. Based on the amount of current sensed, the controller controls current flowing through the first phase-leg as well as current flowing through the second phase-leg.

20 Claims, 6 Drawing Sheets

MULTI-PHASE DC-DC CONVERTER CONTROL

BACKGROUND

1. Technical Field

A system and method for controlling a multi-phase DC-DC converter.

2. Background Art

A multi-phase DC-DC converter (MPC) includes a DC-DC converter with multiple phase-legs connected in parallel. Connecting the phase-legs in parallel allows the current flowing through the MPC (hereinafter "inductor current") to be distributed between the phase-legs. Distributing the inductor current between the phase-legs provides a number of benefits, particularly for automotive power systems. Consequently, the MPC has gained increasing attention in many automotive applications as demands for automotive power systems have increased.

With reference to FIG. 1, a 2-stage multi-phase DC-DC converter 10 has a first phase-leg 14 and a second phase-leg 16. In addition, the first phase-leg 14 and the second phase-leg 16 are connected in parallel to a battery 12. The first phase-leg 14 has an inductor L1, a switch S1, and a switch S2. The second phase-leg 16 has an inductor L2, a switch S3, and a switch S4. In addition, the 2-stage multi-phase DC-DC converter 10 has a plurality of current sensors 18. The plurality of current sensors 18 sense respective currents flowing through inductors L1 and L2. However, the plurality of current sensors 18 increases the cost, volume, and weight of the 2-stage multi-phase DC-DC converter 10.

With reference to FIG. 2, a first switching signal 21 controls the switch S1 of the first phase-leg 14 (shown in FIG. 1). In addition, a second switching signal 22 controls the switch S2 in the first phase-leg 14 (shown in FIG. 1). In the second phase-leg 16, a third switching signal 23 controls the switch S3 (shown in FIG. 1) and a fourth switching signal 24 controls the switch S4 (shown in FIG. 1).

As shown in FIG. 2, the switching signals 21, 22, 23, and 24 have the same switching frequency and pulse-width modulation (PWM) period. However, switching signals 21 and 22 have a 180° phase shift with respect to switching signals 23 and 24. Since the MPC is a 2-stage converter, the 180° phase shift between switching signals 21 and 22 and switching signals 23 and 24 may reduce the amount of ripple current in the battery 12 or a capacitor (not illustrated). The capacitor may be in parallel with the battery 12, the Vdc, or both the battery 12 and the Vdc.

It is often desirable or necessary to decrease the size and weight of automotive power systems in automotive vehicles to make automotive vehicles more compact, lightweight, and fuel efficient. In addition, it is often desirable or necessary to increase the power density and efficiency of automotive power systems.

With the introduction of the MPC, the distribution of inductor current between the phase-legs provides a number of benefits to automotive power systems. For example, automotive power systems can use smaller components as well as more cost-effective components. Furthermore, automotive power systems can be more compact, lightweight, and inexpensive. In addition, inputs and outputs of automotive power systems typically experience lower ripples. With lower ripples in the automotive power system, filtering losses can be reduced and the filtering system can be reduced in size.

One challenge with distribution of inductor current between phase-legs in the MPC deals with distributing the inductor current in an efficient, reliable, and cost-effective manner. If an improper distribution of inductor current exists between the phase-legs, then the phase-legs may dissipate unequal amounts of heat and lose different amounts of power. As a result, the MPC may experience reduced efficiency and reliability.

An improved MPC control is desired to improve distribution of inductor current between phase-legs in the MPC.

SUMMARY

A control system for controlling a first phase-leg and a second phase-leg of a DC-DC converter. The first and second phase-legs are connected in parallel between a battery and a direct current (DC) link. The control system includes a single current sensor and a controller. The single current sensor senses an amount of current flowing through the direct current link. In addition, the single current sensor generates a sensor signal indicating the amount of current flowing through the direct current link. The sensor signal indicates an amount of current flowing through the first phase-leg during a first time interval. Furthermore, the sensor signal indicates an amount of current flowing through the second phase-leg during a second time interval. The controller receives the sensor signal from the single current sensor. In response to the sensor signal, the controller generates and transmits a first command signal to the first phase-leg. In addition, the controller generates and transmits a second command signal to the second phase-leg in response to the sensor signal. The first command signal controls current flowing through the first phase-leg. The second command signal controls current flowing through the second phase-leg.

BRIEF DESCRIPTION OF THE DRAWINGS

FIG. 4(a) is a schematic diagram illustrating current flowing through inductor L1 and into a DC link when switches S1 and S4 are OFF while switches S2 and S3 are ON;

FIG. 4(c) is a schematic diagram illustrating the single current sensor detecting no current flowing through either inductor L1 or inductor L2 when switches S2 and S4 are OFF while switches S1 and S3 are ON;

FIG. 4(d) is a schematic diagram illustrating the current flowing through the DC link is a sum amount of current flowing through inductors L1 and L2 when switches S1 and S3 are OFF while switches S2 and S4 are ON;

DETAILED DESCRIPTION

Embodiments of the present invention generally provide control of a multi-phase DC-DC converter (MPC) using a single current sensor to control distribution of the current flowing through the MPC (hereinafter "inductor current") between or among phase-legs of the MPC.

Figure 3:
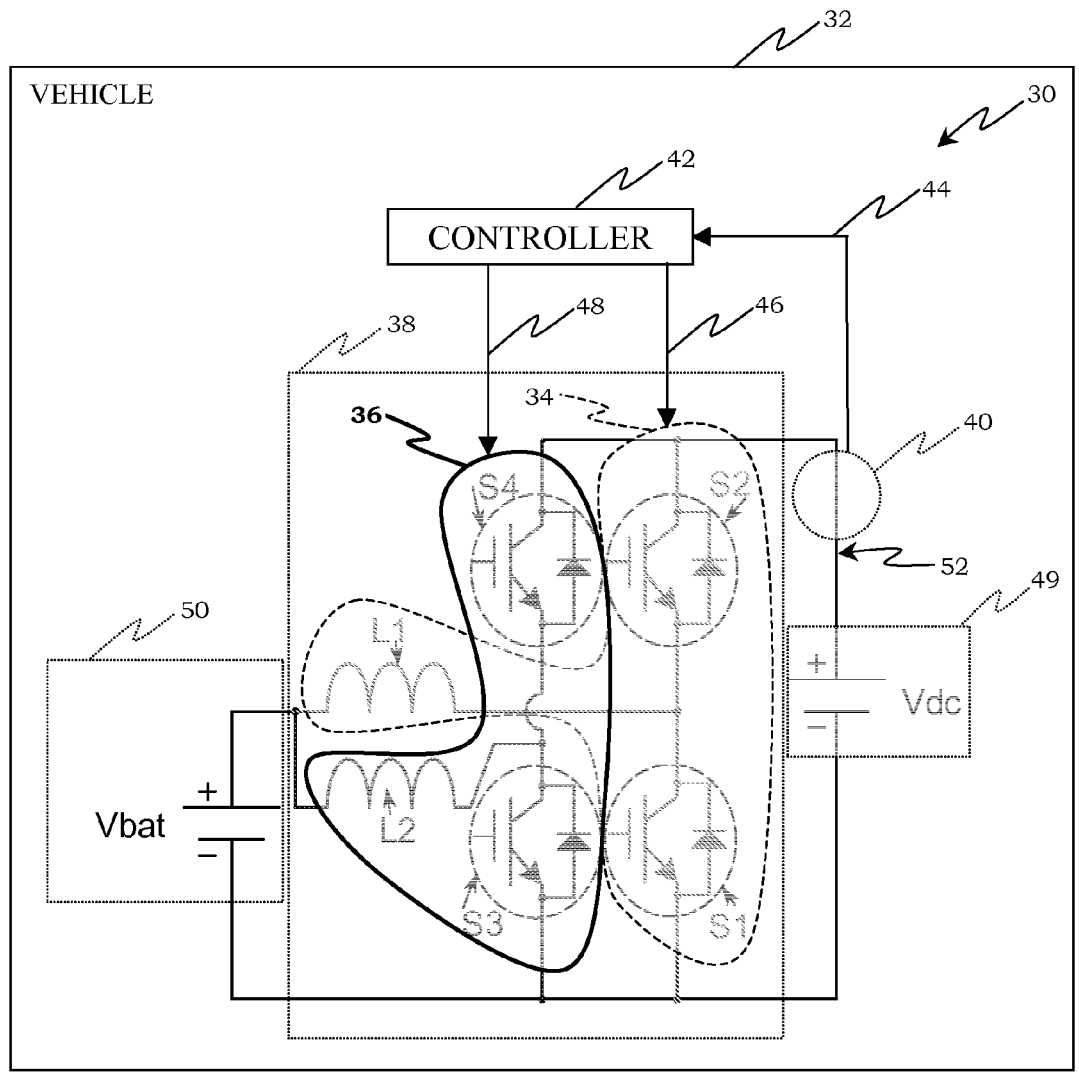
FIG. 3 is a schematic diagram illustrating a control system having a single current sensor and a controller for controlling phase-legs of a multi-phase DC-DC converter.
Figure 4A:
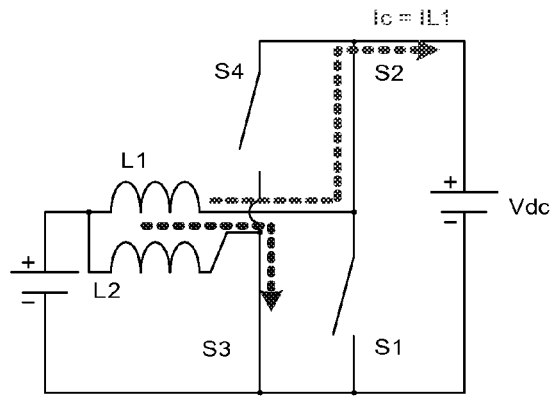
Figure 4B:
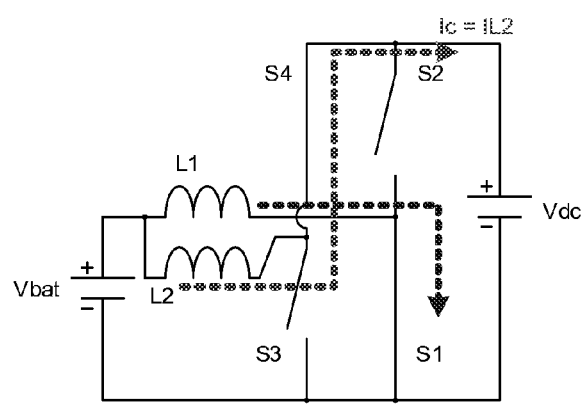
FIG. 4(b) is a schematic diagram illustrating current flowing through inductor L2 and into the DC link when switches S1 and S4 are ON while switches S2 and S3 are OFF.
Figure 4C:
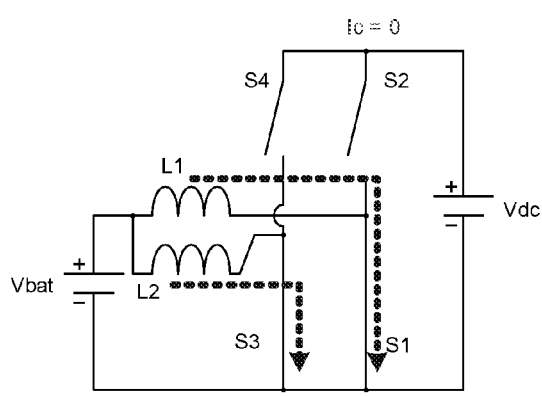
Figure 4D:
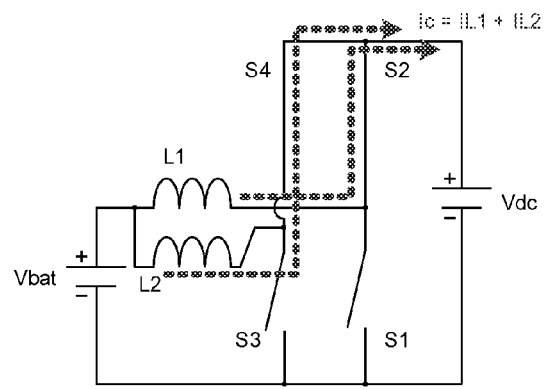

With reference to FIG. 3, a control system 30 for controlling a first phase-leg 34 and a second phase-leg 36 is provided. The control system 30 may be part of a powertrain in an automotive vehicle 32. However, the control system 30 may be part of a non-automotive system. The control system 30 and its method of operation are described in an integrated manner to facilitate understanding of various aspects of the invention.

The first phase-leg 34 and the second phase-leg 36 are connected in parallel to form a multi-phase DC-DC converter (MPC) 38. Connecting the phase-legs in parallel allows the inductor current to be distributed between the phase-legs 34, 36. The MPC 38 may be a 2-stage MPC having two phase-legs, a 3-stage MPC having three phase-legs connected in parallel, or a MPC having any number of phase-legs connected in parallel.

As described below and illustrated in FIGS. 3-7, the MPC 38 is described as a 2-stage MPC. However, the control system 30 can control the MPC 38 having any number of phase-legs connected in parallel. For example, the control system 30 may control the 3-stage MPC.

With continuing reference to FIG. 3, the first phase-leg 34 of the MPC 38 has an inductor L1, a switch S1, and a switch S2. Likewise, the second phase-leg 36 has an inductor L2, a switch S3, and a switch S4. In addition, the MPC 38 has a direct current (DC) link 52 that electrically connects the first phase-leg 34 to the second phase-leg 36. In addition, the DC link 52 connects the MPC 38 to a load 49, such as a DC voltage source labeled "Vdc" in FIG. 3.

As shown in FIG. 3, the MPC 38 may be connected between a battery 50 and the load 49. For example, the load 49 may be a DC bus in the automotive vehicle 32. However, the MPC 38 and the load 49 are not limited to automotive vehicle applications. Being connected between the battery 50 and the DC bus, the MPC 38 can provide a suitable electrical interface between the battery 50 and the DC bus. For example, the MPC 38 can provide an electrical interface between the battery 50 and the DC bus of an alternating current (AC) inverter in the automotive vehicle 32. The automotive vehicle may be an automotive vehicle without a high-voltage system, such as a vehicle having an internal combustion engine. In addition, the automotive vehicle 32 may be a hybrid electric vehicle (HEV), a plug-in hybrid electric vehicle (PHEV), a fuel cell electric vehicle (FCEV), battery electric vehicle (BEV), or other type of automotive vehicle having a high-voltage system.

Figure 1:
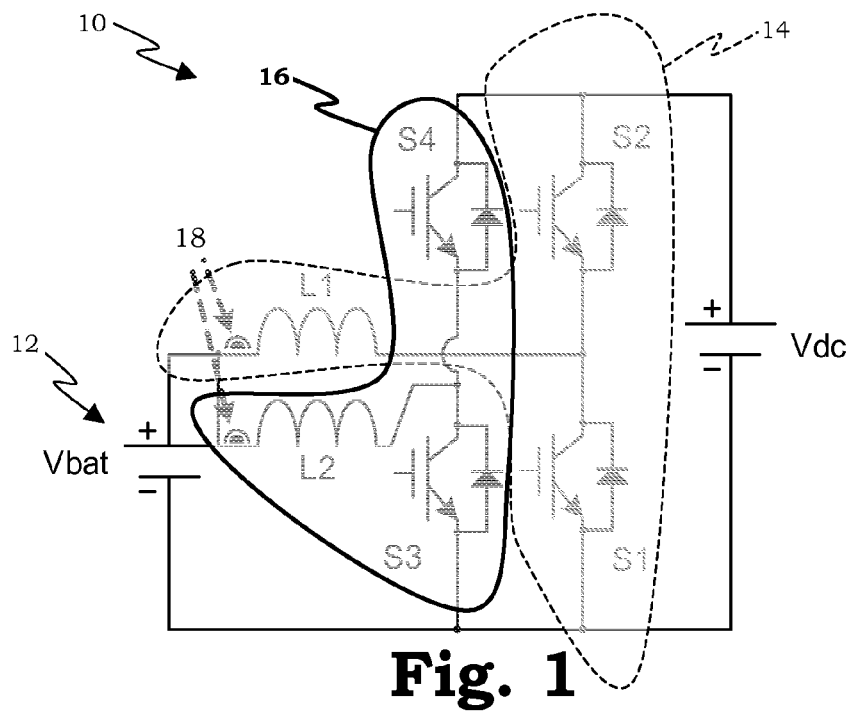
FIG. 1 is a schematic diagram illustrating a 2-stage multi-phase DC-DC converter with two current sensors.
Figure 2:
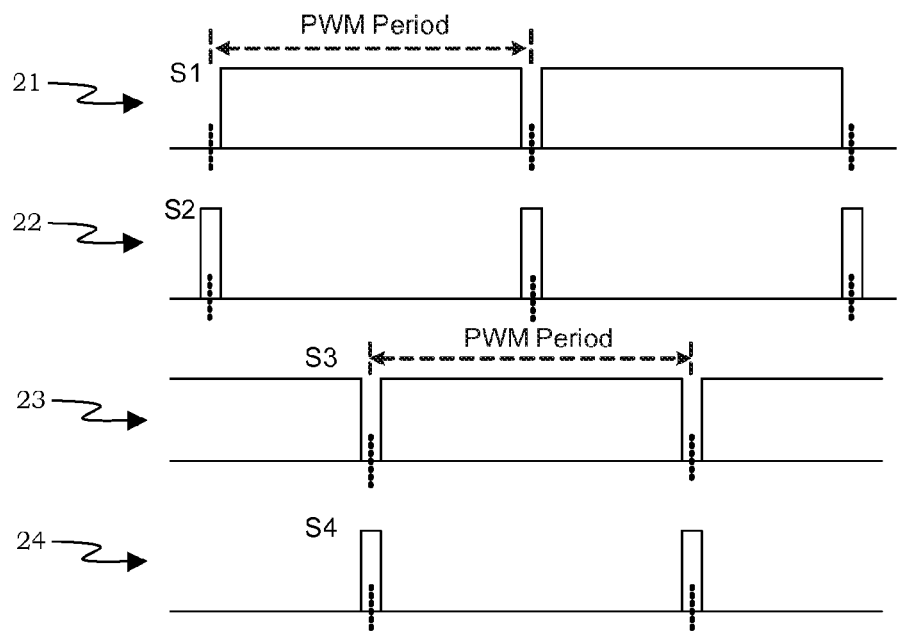
FIG. 2 is a graph illustrating four switching signals used to control switches of the 2-stage multi-phase DC-DC converter illustrated in FIG. 1.

With continuing reference to FIG. 3, the control system 30 has a single current sensor 40 and a controller 42. Using the single current sensor 40, instead of a plurality of current sensors (as shown in FIG. 1), in the control system 30 provides a number of benefits. For example, the control system 30 can be made at a lower cost. In addition, the control system 30 may be reduced in size, volume, and weight.

As shown in FIG. 3, the single current sensor 40 senses or detects an amount of current flowing through the DC link 52 at different time intervals. The amount of current flowing through the DC link 52 indicates the amount of current flowing, at any given time interval, through either the first phase-leg 34, the second phase-leg 36, both the first phase-leg 34 and the second phase-leg 36, or neither the first phase-leg 34 nor the second phase-leg 36. Whether the DC link 52 indicates or detects an amount of current flowing through the first phase-leg 34, the second phase-leg 36, both phase-legs, or neither phase-legs depends on the switching state of switches S1, S2, S3 and S4 of the MPC 38.

With reference to FIG. 4(*a*), switches S1 and S4 of the MPC 38 are in the off-state and switches S2 and S3 are in the on-state. During this switching-state configuration of switches S1, S2, S3, and S4 (illustrated in FIG. 4(*a*)), the amount of current flowing through the DC link 52 is an amount of current flowing through inductor L1 of the first phase-leg 34, which is also an amount of current flowing through the first phase-leg 34. With the switching states shown in FIG. 4(*a*), the single current sensor 40 can sense the amount of current flowing through inductor L1.

With reference to FIG. 4(*b*), switches S2 and S3 of the MPC 38 are in the off-state and switches S1 and S4 are in the on-state. During this switching-state configuration of switches S1, S2, S3, and S4 (illustrated in FIG. 4(*b*)), the amount of current flowing through the DC link 52 is an amount of current flowing through inductor L2 of the second phase-leg 36. Also during this switching-state configuration, the amount of current flowing through inductor L2 of the second phase-leg 36 is an amount of current flowing through the second phase-leg 36. With the switching states shown in FIG. 4(*c*), the single current sensor 40 can sense the amount of current flowing through inductor L2.

With reference to FIG. 4(*c*), switches S2 and S4 of the MPC 38 are in the off-state and switches S1 and S3 are in the on-state. During this switching-state configuration of switches S1, S2, S3, and S4 (illustrated in FIG. 4(*c*)), the single current sensor 40 cannot detect current flowing through either inductor L1 or inductor L2 albeit current may be flowing through inductors L1 and L2.

With reference to FIG. 4(*d*), switches S1 and S3 of the MPC 38 are in the off-state and switches S2 and S4 are in the on-state. During this switching-state configuration of switches S1, S2, S3, and S4 (illustrated in FIG. 4(*d*)), the amount of current flowing through the DC link 52 is equal to a sum amount of current flowing through inductors L1 and L2. Also during this switching-state configuration, the sum amount of current flowing through inductors L1 and L2 is the amount of current flowing through the MPC 38, or the inductor current. With the switching states shown in FIG. 4(*d*), the single current sensor 40 can sense the sum amount of current flowing through inductors L1 and L2. As a result, the single current sensor 40 detects the sum of the two currents flowing through inductors L1 and L2. However, the single current sensor 40 is unable to sense an individual amount of current flowing through either inductor L1 or inductor L2 during the switching-state configuration illustrated in FIG. 4(*d*).

As illustrated in FIG. 3, the single current sensor 40 generates a sensor signal 44 in response to sensing the amount of current flowing through the DC link 52. The amounts of current sensed by the single current sensor 40 flowing through the DC link 52 may referred to as "sensed currents." The single current sensor 40 embeds or encodes the amount of current flowing through the DC link 52 in the sensor signal 44. During a first time interval the single current sensor 40 embeds or encodes the amount of current flowing through the first phase-leg 34 as sensed by the single current sensor 40 in the DC link 52. During a second time interval, the single current sensor 40 embeds or encodes the amount of current flowing through the second phase-leg 36 as sensed by the single current sensor 40 in the DC link 52. Furthermore, the single current sensor 40 may embed or encode the amount of current flowing through the DC link 52 in the sensor signal 44 during other time intervals. For example, the single current sensor 40 may sense and embed or encode the amount of current flowing through both the first phase-leg 34 and the second phase-leg 36 during a third time interval. During a fourth time interval, the single current sensor 40 may sense and embed or encode the amount of current flowing through neither the first phase-leg 34 nor the second phase-leg 36. The amount of current flowing during the third and fourth time intervals may used by the control system 30 for various purposes, such as diagnostics, current estimation, etc.

As shown in FIG. 3, the controller 42 of the control system 30 receives the sensor signal 44 from the single current sensor 40. Based on the sensor signal 44, the controller 42 compares each of the sensed currents (e.g., the amount of current flowing through the first phase-leg 34 during the first time interval as well as the amount of current flowing through the second phase-leg 36 during the second time interval) to command values. The controller 42 may generate the command values. Alternatively, another system positioned in the automotive vehicle 32 may generate and transmit the command values to the controller 42 of the control system 30.

The command values indicate a desired or target amount of current at a particular time for each phase-leg 34, 36. The target amounts of current of the phase-legs 34, 36 may or may not be equal. If the target amount of current does not match the corresponding sensed current, then the control system 30 may redistribute the inductor current between the phase legs 34, 36. The control system 30 may continue to redistribute the inductor current between the phase legs 34, 36 in an effort to match the corresponding sensed current to the target amount of current, which may vary over time.

The control system 30 may redistribute the inductor current between the phase legs 34, 36 in an effort to optimize the amount of current flowing through each phase-leg 34, 36. In such an example, the target amount of current for each phase-leg 34, 36 may be independent of each other. For example, the target amount of current in the first phase-leg 34 may be increased while the target amount of current in the second phase-leg 36 may be decreased to distribute a greater portion of the inductor current to the first phase-leg 34. In such an example, the target amount of current in the second phase-leg 36 may be decreased to zero so that all of the inductor current flows through the first phase-leg 34. Furthermore, target amounts in the first phase-leg 34 may change over time at different rates than target amounts in the second phase-leg 36. Alternatively, the control system 30 may redistribute the inductor current between the phase legs 34, 36 so that the command values indicate target amounts of current that are relatively fixed in proportion.

The control system 30 may redistribute the inductor current between the phase legs 34, 36 in an effort for each phase-leg 34, 36 to dissipate equal amounts of heat. In such an example, the command values may indicate a target amount of current for each phase leg 34, 36 to balance the amount of energy lost between the first phase-leg 34 and the second phase-leg 36. Balancing the amount of energy lost between the phase-legs 34, 36 may increase the efficiency and reliability of the MPC 38. In an effort to balance the amount of energy lost between the first phase-leg 34 and the second phase-leg 36, a target amount of current flowing through the first phase-leg 34 may equal a target amount of current flowing through the second phase-leg 36. However, the target amount of current flowing through the first phase-leg 34 may or may not be equal to the target amount of current flowing through the second phase-leg 36, depending on the configuration of the phase legs 34, 36 and the load 49.

In another scenario, the control system 30 may redistribute the inductor current between the phase legs 34, 36 in an effort for each phase-leg 34, 36 to dissipate different amounts of heat. For example, this may be beneficial if one of the inductors L1, L2, which may have overheated, needs to cool to a lower temperature. In another example, zero current in one of the phase-legs 34, 46 may be desirable to provide simpler control and/or more predictable behavior of the MPC 38 while operating the MPC 38 at a relatively low level of inductor current. For example, the low level of inductor current may be 1 amp. However, the low level of inductor current may be greater than or less than 1 amp depending on the design of the MPC 38. In addition, the low level of inductor current may allow ripple current to flow continuously through one of the inductors L1, L2. Furthermore, the low level of inductor current may allow ripple current to flow in the same direction as the average inductor current. When the average value of inductor current becomes small, the nominal-to-peak ripple current may be greater than the average value of inductor current and cause the ripple current to reverse direction from the direction of the desired average current or to become zero for a portion of the PWM period, which may be undesirable. The control system 30 may allow no inductor current to flow through one of the phase-legs 34, 36 to increase the average current in the other phase-leg and thus in an effort prevent the ripple current from either reversing direction or becoming zero.

After comparing the sensed currents to the command values indicating target amounts of current for each phase-leg 34, 36, the controller 42 either changes or maintains the amount of current flowing through the first phase-leg 34 and the amount of current flowing through the second phase-leg 36. More specifically, the controller 42 transmits a first command signal 46 to the first phase-leg 34 and a second command signal 48 to the second phase-leg 36 to control the amount of current flowing through each inductor L1, L2. For example, the controller 42 may transmit the command signals 46, 48 to change or maintain the amount of current flowing through each inductor L1, L2. When the current flowing through the MPC 38 is properly controlled in the first phase-leg 34 and second phase-leg 36, then the efficiency and reliability of the MPC 38 may be improved.

As collectively illustrated in FIGS. 3-6(b), the first command signal 46 may include a first switching signal 61 and a second switching signal 62. The first switching signal 61 controls switch S1 in the first phase-leg 34. Similarly, the second switching signal 62 controls switch S2. The first switching signal 61 and the second switching signal 62 are complementary because when one of the switching signals 61, 62 is in an on-state, the other switching signal is in an off-state. In other words, one of the switching signals 61, 62 is in the on-state while the other switching signal is in the off-state.

With continuing reference to FIGS. 3-6(b), the second command signal 48 may include a third switching signal 63 and a fourth switching signal 64. The third switching signal 63 controls switch S3, and the fourth switching signal 64 controls switch S4 in the second phase-leg 36. In addition, the third switching signal 63 and the fourth switching signal 64 are complementary, because when one of the switching signals 63, 64 is in the on-state, the other switching signal is in the off-state.

Figure 5A:
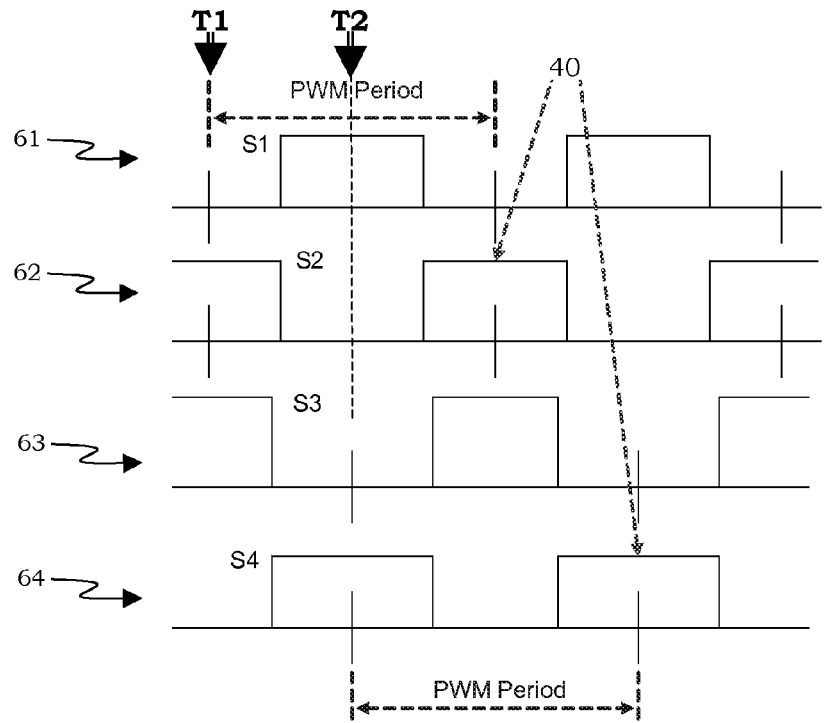
FIG. 5(a) is a graph illustrating when the single current sensor sensing an amount of current flowing through the DC link during a center-aligned pulse-width modulation (PWM) scheme.
Figure 5B:
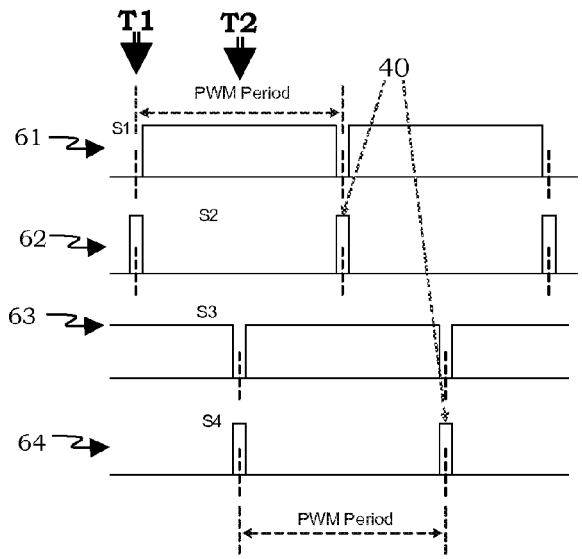
FIG. 5(b) is a graph illustrating switching signals of switches S1 and S3 having a duty cycle close to 1.
Figure 5C:
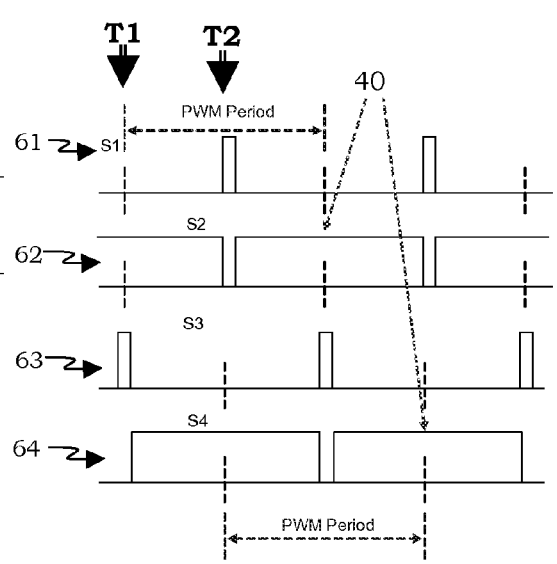
FIG. 5(c) is a graph illustrating switching signals of switches S1 and S3 having a duty cycle close to 0.

As shown in FIGS. 5(*a*)-6(*b*), the switching signals 61, 62, 63, and 64 are shown as pulse waves or pulse trains. However switching signals 61, 62, 63, and 64 may be any suitable type of waveform. In addition, the single current sensor 40 may sense the amount of current flowing through the DC link 52 using a center-aligned pulse-width modulation (PWM) scheme. The center-aligned PWM are illustrated in FIGS. 5(*a*)-6(*b*) as vertical dashed lines.

With reference to FIG. 5(*a*), the switching signals 61, 62, 63, and 64 have the same switching frequency and pulse-width modulation (PWM) period. The switching frequency may be less than one kilohertz (1 kHz) or up to hundreds of kilohertz. For example, the switching frequency may be between 5 and 20 kHz, such as 10 kHz. The PWM period is the inverse of the switching frequency. Thus, a 10 kHz switching frequency corresponds to a PWM period of 100 microseconds (100 µsec).

As illustrated in FIG. 5(*a*), the switching signals 61 and 62 have a 180° phase shift with respect to switching signals 23 and 24. However, the control system 30 can control any number of phase-legs connected in parallel. As the number of phase-legs connected in parallel changes, so does the phase shift between the switching signals 61, 62 and the switching signals 63, 64. For example, if the control system 30 controls the 3-stage MPC, then the switching signals 61 and 62 have a 120° phase shift with respect to switching signals 63 and 64. Likewise, if the control system 30 controls a 4-stage MPC having four phase-legs connected in parallel, then the switching signals 61 and 62 have a 90° phase shift with respect to switching signals 63 and 64.

With continuing reference to FIG. 5(*a*), each of the switching signals 61, 62, 63, and 64 may have a duty cycle between 0 and 1. For example, each of the switching signals 61, 62, 63, and 64 may have a duty cycle close or equal to one-half (0.5) or fifty-percent (50%). A duty cycle close or equal to 50% may help to accurately and reliably embed or encode the amount of current flowing through the phase-legs 34, 36 (as sensed by the single current sensor 40 in the DC link 52) during the respective time intervals, such as T1 and T2. However, the duty cycle of the switching signals 61, 62, 63, and 64 may vary or fluctuate above or below 50% during operation of the control system 30.

As shown in FIG. 5(*a*), each of the switching signals 61, 62, 63, and 64 may have a duty cycle close to 50%. The single current sensor 40 senses the amount of current flowing through the DC link 52 during at least two time intervals, such as T1 and T2.

With continuing reference to FIG. 5(*a*), during the first time interval (e.g., T1), which corresponds to the mid-point of when switches S1 and S4 are in the off-state and the mid-point of when switches S2 and S3 are in the on-state, the single current sensor 40 senses the amount of current flowing through inductor L1 (shown in FIG. 4(*a*)). The first time interval (e.g., T1) also corresponds to when switching signals 61, 62 are at the beginning of their PWM switching period as illustrated in FIG. 5(*a*).

With continuing reference to FIG. 5(*a*), during the second time interval (e.g., T2), which corresponds to the mid-point of when switches S1 and S4 are in the on-state and the mid-point of when switches S2 and S3 are in the off-state, the single current sensor 40 senses the amount of current flowing through inductor L2 (shown in FIG. 4(*b*)). The second time interval (e.g., T2) also corresponds to when switching signals 63, 64 are at the beginning of their PWM switching period, which is offset from the beginning of the PWM switching period of switching signals 61, 62 as illustrated in FIG. 5(*a*).

As illustrated in FIG. 5(*b*), switching signals 61 and 63 may have a duty cycle close to 1, which may be undesirable. If switching signals 61 and 63 have a duty cycle close to 1, then the single current sensor 40 may not reliably detect the amount of current flowing through either the first phase-leg 34 or the second phase-leg 36 during the respective time intervals, such as T1 and T2. Therefore, switching signals 61 and 63 may be limited to a maximum duty cycle below 1. For example, the maximum duty cycle may be 0.6, which is a duty cycle below 1. In addition, limiting the maximum duty cycle can improve a minimum measurement time. A phase-leg dead-time and an analog-to-digital (A/D) converter acquisition time of switching signals 61 and 63 may determine the minimum measurement.

With reference to FIG. 5(*c*), switching signals 61 and 63 may have a duty cycle close to 0, which may be undesirable. If switching signals 61 and 63 have a duty cycle close to 0, then the single current sensor 40 may not reliably detect the amount of current flowing through either the first phase-leg 34 or the second phase-leg 36 during the respective time intervals, such as T1 and T2. If switching signals 61 and 63 have a duty cycle close to 0, then the single current sensor 40 may detect the amount of current flowing through the DC link 52 when switches S1 and S3 of the MPC 38 are in the off-state (shown in FIG. 4(*d*)). Consequently, the single current sensor 40 may detect the sum of the two currents flowing through inductors L1 and L2, such that the individual amount of current flowing through either inductor L1 or inductor L2 may not be reliably detected in the DC link 52. Therefore, switching signals 61 and 63 may be limited to a minimum duty cycle above 0. For example, the minimum duty cycle may be 0.4, which is a duty cycle above 0.

Figure 6A:
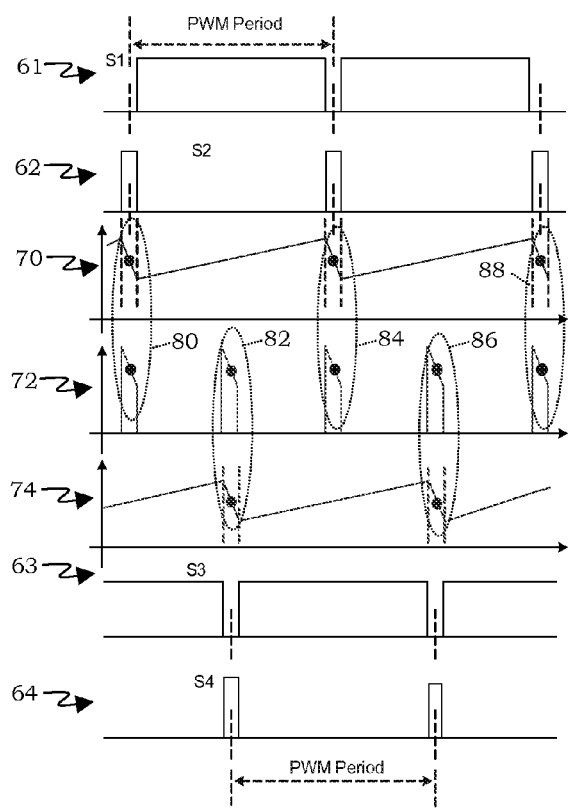
FIG. 6(a) is a graph illustrating the single current sensor sensing the amount of current flowing through the DC link during a high duty cycle.
Figure 6B:
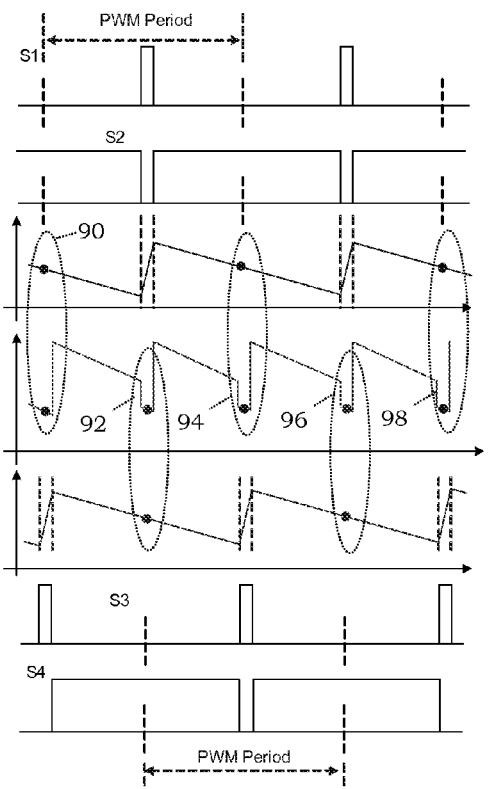
FIG. 6(*b*) is a graph illustrating the single current sensor sensing the amount of current flowing through the DC link during a low duty cycle.

With reference to FIG. 6(*a*)-(*b*), waveform 70 indicates the amount of current flowing through inductor L1. Waveform 72 indicates the amount of current flowing through the DC link 52 as sensed by the single current sensor 40. Waveform 74 indicates the amount of current flowing through inductor L2.

With reference to FIG. 6(*a*), switching signals 61 and 63 may have a duty cycle below 1. During time interval 80, the amount of current flowing through the DC link 52 indicates the amount of current flowing through inductor L1. During time interval 82, the amount of current flowing through the DC link 52 indicates the amount of current flowing through inductor L2. During time interval 84, the amount of current flowing through the DC link 52 indicates the amount of current flowing through inductor L1. During time interval 86, the amount of current flowing through the DC link 52 indicates the amount of current flowing through inductor L2. During time interval 88, the amount of current flowing through the DC link 52 indicates the amount of current flowing through inductor L1.

With reference to FIG. 6(*b*), switching signals 61 and 63 may have a duty cycle above 0. During time interval 90, the amount of current flowing through the DC link 52 indicates the amount of current flowing through inductor L1. During time interval 92, the amount of current flowing through the DC link 52 indicates the amount of current flowing through inductor L2. During time interval 94, the amount of current flowing through the DC link 52 indicates the amount of current flowing through inductor L1. During time interval 96, the amount of current flowing through the DC link 52 indicates the amount of current flowing through inductor L2. During time interval 98, the amount of current flowing through the DC link 52 indicates the amount of current flowing through inductor L1.

Depending on the number of phase-legs in the MPC 38, the maximum and minimum duty cycles may be changed so that the single current sensor 40 can accurately and reliably sense the amount of current flowing through the phase-legs during the respective time intervals.

Figure 7:
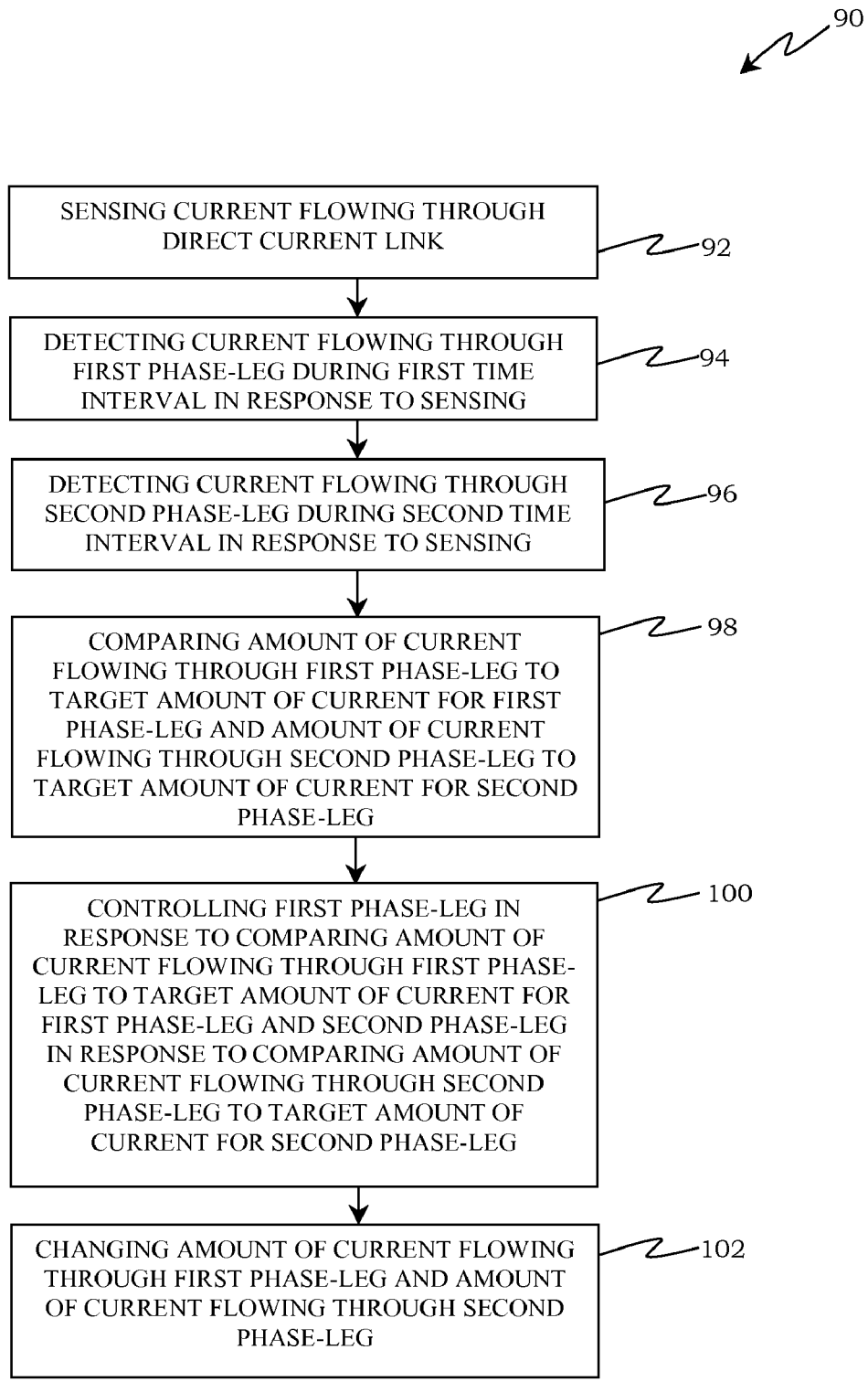
FIG. 7 is a flowchart diagram illustrating a method of controlling the phase-legs of the multi-phase DC-DC converter.

With reference to FIG. 7, a method 90 of controlling the first phase-leg 34 and the second phase-leg 36 (illustrated in FIG. 3) is provided. In block 92, the single current sensor 40 (shown in FIG. 3) senses the amount of current flowing through the direct current link 52 (depicted in FIG. 3). In block 94, the single current sensor 40 detects the amount of current flowing through the first phase-leg 34 during the first time interval in response to sensing the amount of current flowing through the direct current link 52. In block 96, the single current sensor 40 detects the amount of current flowing through the second phase-leg 36 during the second time interval in response to sensing the amount of current flowing through the direct current link 52. In block 98, the method includes comparing the amount of current flowing through the first phase-leg 34 to a target amount of current for the first phase-leg 34. Also in block 98, the method includes comparing the amount of current flowing through the second phase-leg 36 to a target amount of current for the second phase-leg 36. The controller 42 may compare the amounts of currents to respective target amounts. In block 100, the controller 42 controls the first phase-leg 34 in response to comparing the amount of current flowing through the first phase-leg 34 to the target amount of current for the first phase-leg 34. Also in block 100, the controller 42 controls the second phase-leg 36 in response to comparing the amount of current flowing through the second phase-leg 36 to the target amount of current for the second phase-leg 36. Controlling the first phase-leg 34 and the second phase-leg 36 controls current flowing through the first phase-leg 34 and the second phase-leg 36. In addition, the method 90 may include block 102. In block 102, controlling the first phase-leg 34 and the second phase-leg 36 changes the amount of current flowing through the first phase-leg 34 and the amount of current flowing through the second phase-leg 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A control system for controlling a first phase-leg and a second phase-leg connected in parallel in a DC-DC converter between a battery and a direct current (DC) link, the control system comprising:

single current sensor generating a sensor signal indicating an amount of current flowing through the direct current link, including an amount of current flowing through the first phase-leg during a first time interval and an amount of current flowing through the second phase-leg during a second time interval; and controller configured to receive the sensor signal from the single current sensor and generate and transmit a first command signal to the first phase-leg and a second command signal to the second phase-leg;

whereby the first command signal controls current flowing through the first phase-leg, and the second command signal controls current flowing through the second phase-leg;

wherein the controller redistributes the current between the first phase-leg and the second phase-leg to dissipate unequal amounts of heat in the first phase-leg and the second phase-leg.

2. The control system of claim 1 wherein the controller transmits the first command signal and the second command signal to change the amount current flowing through the first phase-leg to be different from the amount of current flowing through the second phase-leg.

3. The control system of claim 1 wherein the first command signal includes a first switching signal and a second switching signal, and the second command signal includes a third switching signal and a fourth switching signal, the first switching signal controlling a first switch in the first phase-leg, the second switching signal controlling a second switch in the first phase-leg, the third switching signal controlling a third switch in the second phase-leg, and the fourth switching signal controlling a fourth switch in the second phase-leg.

4. The control system of claim 3 wherein the first switching signal complements the second switching signal and the third switching signal complements the fourth switching signal.

5. The control system of claim 3 wherein the first switching signal switches the first switch to an off-state, the second switching signal switches the second switch to an on-state, the third switching signal switches the third switch to the on-state, and the fourth switching signal switches the fourth switch to the off-state to allow the single current sensor to sense the amount of current flowing through the direct current link and generate the sensor signal indicating the amount of current flowing through the first phase-leg during the first time interval.

6. The control system of claim 5 wherein the amount of current flowing through the first phase-leg indicates an amount of current flowing through an inductor in the first phase-leg.

7. The control system of claim 3 wherein the first switching signal switches the first switch to an on-state, the second switching signal switches the second switch to an off-state, the third switching signal switches the third switch to the off-state, and the fourth switching signal switches the fourth switch to the on-state to allow the single current sensor to sense the amount of current flowing through the direct current link and generate the sensor signal indicating the amount of current flowing through the second phase-leg during the second time interval.

8. The control system of claim 7 wherein the amount of current flowing through the second phase-leg indicates an amount of current flowing through an inductor in the second phase-leg.

9. The control system of claim 1 wherein the controller generates the first command signal and the second command signal to redistribute the current between the first phase-leg and the second phase-leg in response to the target amount of current for the first phase-leg and the target amount of current for the second phase-leg.

10. The control system of claim 1 wherein the single current sensor senses the amount of current flowing through the direct current link using a center-aligned pulse-width modulation (PWM) scheme.

11. The control system of claim 10 wherein the single current sensor senses the amount of current flowing through the direct current link at a switching frequency between 5 and 20 kHz.

12. The control system of claim 11 wherein the switching frequency is 10 kHz.

13. The control system of claim 1 wherein the controller is configured to generate and transmit the first and second command signals in an effort to prevent ripple current flow from reversing direction in at least one of the phase legs.

14. The control system of claim 1 wherein the controller compares the amount of current flowing through the first phase-leg to a target amount of current for the first phase-leg to generate the first command signal and the amount of current flowing through the second phase-leg to a target amount of current for the second phase-leg to generate the second command signal.

15. The control system of claim 1 wherein the target amounts of current for the first and second phase-legs are different from each other.

16. A control system for controlling a first phase-leg and a second phase-leg, the first and second phase-legs being connected in parallel between a battery and a direct current (DC) link, the control system comprising:
    a single current sensor configured to sense an amount of current flowing through the direct current link using a center-aligned pulse-width modulation (PWM) scheme and generate a sensor signal indicating the amount of current flowing through the direct current direct current link, the sensor signal indicating an amount of current flowing through the first phase-leg during a first time interval and an amount of current flowing through the second phase-leg during a second time interval; and
    a controller configured to receive the sensor signal from the single current sensor, compare the amount of current flowing through the first phase-leg to a target amount of current for the first phase-leg to generate and transmit a first command signal to the first phase-leg, and compare the amount of current flowing through the second phase-leg to a target amount of current for the second phase-leg to generate and transmit a second command signal to the second phase-leg;
    whereby the first command signal includes a first switching signal and a second switching signal, and the second command signal includes a third switching signal and a fourth switching signal, the first switching signal controlling a first switch in the first phase-leg, the second switching signal controlling a second switch in the first phase-leg, the third switching signal controlling a third switch in the second phase-leg, and the fourth switching signal controlling a fourth switch in the second phase-leg to control the amount of current flowing through the first phase-leg and the amount of current flowing through the second phase-leg;
    wherein the controller redistributes the current between the first phase-leg and the second phase-leg to dissipate unequal amounts of heat in the first phase-leg and the second phase-leg.

17. The control system of claim 16 wherein during the first time interval the first switching signal switches the first switch to an off-state, the second switching signal switches the second switch to an on-state, the third switching signal switches the third switch to the on-state, and the fourth switching signal switches the fourth switch to the off-state, and during the second time interval the first switching signal switches the first switch to the on-state, the second switching signal switches the second switch to the off-state, the third switching signal switches the third switch to the off-state, and the fourth switching signal switches the fourth switch to the on-state to allow the single current sensor to sense the amount of current flowing through the direct current link during the time intervals and generate the sensor signal indicating the amount of current flowing through the first phase-leg during the first time interval and the amount of current flowing through the second phase-leg during the second time interval.

18. The control system of claim 17 wherein the controller generates the first switching signal, the second switching signal, the third switching signal, and the fourth switching signal to change the amount of current flowing through the first phase-leg to be different from the amount of current flowing through the second phase-leg in response to the target amount of current for the first phase-leg and the target amount of current for the second phase-leg being different from each other.

19. A method of controlling a first phase-leg and a second phase-leg connected in parallel in a DC-DC converter between a battery and a direct current (DC) link, the method comprising:
    detecting respective currents flowing through the first and second phase-legs during respective first and second time intervals using a single current sensor in the direct current link;
    comparing the respective currents to respective target amounts of current for the first and second phase-legs, the target amounts of current for the first and second phase-legs being different from each other; and
    controlling the first and second phase-legs in response to comparing the respective currents to the respective target amounts;
    whereby the controlling the first and second phase-legs controls the respective currents flowing through the first and second phase-legs to be different from each other to dissipate unequal amounts of heat in the first and second phase-legs.

20. The method of claim 19 wherein the controlling the first and second phase-legs changes the respective currents flowing through the first and second phase-legs in an effort to prevent ripple current flow from reversing direction in at least one of the phase legs.

* * * * *